United States Patent [19]
Chorel et al.

[11] Patent Number: 4,476,725
[45] Date of Patent: Oct. 16, 1984

[54] DIFFERENTIAL PRESSURE GAUGE

[75] Inventors: Jacques Chorel; André Migeon, both of Chabeuil; Michel Torregrosa, Valence, all of France

[73] Assignee: Crouzet, Paris, France

[21] Appl. No.: 400,118

[22] Filed: Jul. 19, 1982

[30] Foreign Application Priority Data

Jul. 20, 1981 [FR] France ................. 8114230

[51] Int. Cl.³ .................. G01L 7/06; G01L 9/00
[52] U.S. Cl. .............,............ 73/704; 73/DIG. 1; 73/182; 73/717
[58] Field of Search .......... 73/704, 703, 702, 517 AV, 73/DIG. 1, 182, DIG. 4, 862.59, 717

[56] References Cited

U.S. PATENT DOCUMENTS 3,541,849 11/1970 Corbett ..................... 73/862.59
4,091,679 5/1978 Furusawa ................ 73/DIG. 1
4,192,183 3/1980 Avellis et al. .................. 73/182
4,215,570 8/1980 Nisse ........................ 73/862.59
4,311,053 1/1982 Cucci ........................... 73/704

FOREIGN PATENT DOCUMENTS 708191 1/1980 U.S.S.R. ................... 73/702

Primary Examiner—Donald O. Woodiel
Attorney, Agent, or Firm—Holman & Stern

[57] ABSTRACT

A differential pressure gauge comprises a balance beam (3) acting upon a vibrating blade (6). The beam (3) and the blade (6) are disposed in a rigid chamber 4 under vacuum. The beam (3) is acted upon by a force, resulting from the deformation of a flexible or expansible chamber (7) subjected to a pressure $P_T$ and disposed in a second rigid chamber (5) subjected to a pressure $P_S$. A flexible or expansible seal element (9) isolates the chambers but transmits the forces without disturbing them. This gauge has a high precision and delivers information in digital form, particularly useful in aeronautics.

6 Claims, 4 Drawing Figures

DIFFERENTIAL PRESSURE GAUGE

BACKGROUND OF THE INVENTION

1. Field Of The Invention

The present invention relates to a differential pressure gauge comprising a piezo-electric testing body with vibrating blade fixed, on the one hand, on a frame and, on the other hand, on the arm of a balance beam transmitting to it a force resulting from the pressure difference existing between two distinct enclosures, at least one of which is deformable, and respectively subjected to the pressures of which it is desired to measure the difference.

2. Description Of The Prior Art

In devices of this type, the gauges are constituted by a metal structure, the frame, supporting an articulated balance beam which transmits stresses of forces produced by one or more deformable elements such as bellows, membranes or capsules.

For known differential pressure gauges, one or more deformable elements may exist, as in the gauge of French Pat. No. 2 456 945, corresponding to U.S. Pat. No. 4,311,053. In one of the deformable elements or on one of these faces is applied a pressure $P_T$. In the other element or on the other face of the deformable element, another pressure $P_s$ is applied. After calibration of the system, the measurement of differential pressure is such that $\Delta P = P_T - P_s$. However, a gauge incorporating two deformable chambers cannot be precise due to the impossibility of having two mechanically identical chambers. The whole is enclosed in a rigid, tight chamber, in which there may be either a fixed reference pressure (vacuum) or one of the pressures mentioned above ($P_T$ or $P_s$).

In aeronautics, $P_T$ is a total pressure and $P_s$ a static pressure, these pressures being furnished by a Pitot tube.

Furthermore, French Patent 1 522 971 discloses a pressure gauge provided with a testing body and a rod disposed in a first rigid chamber in vacuo, the rod being subjected to the action of a force, resulting from the deformation of a flexible or expansible chamber subjected to the pressure $P_T$ and disposed in a second medium subjected to the pressure $P_S$, via a flexible seal element.

However, it is not a pressure gauge incorporating a balance beam, its expansible chamber is not disposed inside a rigid chamber, and the flexible seal element participates in the transmission of the effort exerted on the testing body, thus disturbing the measurements of differential pressure.

Now, piezo-electric pressure gauges of the type defined hereinabove furnish an analog voltage indicative of $\Delta P$. This output voltage for a large number of models of piezo-electric gauges is of low value, which does not allow a high sensitivity of measurement for certain ranges of pressure. Moreover, taking into account the present tendency whereby the processing of information gives preference to digital calculations, a piezo-electric testing body must be used which incorporates a vibrating blade and which directly delivers an analog signal of sinusoidal form easily convertible into digital form, the testing body being constituted by a blade cut from a quartz monocrystal. To have a high-quality coefficient and to conserve constant dynamic properties, this blade must operate in vacuo, which also avoids the effects of pollution and corrosion.

BRIEF SUMMARY OF THE INVENTION

It is therefore an object of the present invention to produce a differential pressure gauge, using a piezo-electric testing body with vibrating blade, with one deformable chamber for measuring pressure, and of which the seal element does not disturb measurement.

To this end, the invention relates to a pressure gauge of the above-defined type, characterized in that the testing body and the balance beam are disposed in a first rigid chamber in vacuo, the balance beam being subjected to the action of a force $\Delta P$ resulting from the difference in pressure between the pressure $P_T$, which acts inside a flexible or expansible chamber, and the pressure $P_s$ which acts inside a fixed chamber as well as on the outer face of the expansible chamber where pressure $P_T$ prevails, the separation between the fixed chamber $P_s$ and the vacuum chamber in which the vibrating blade is located being obtained via a supple element ensuring a seal, whilst allowing transmission on the blade and by the balance beam of the forces resulting from the measurement of $\Delta P$, and of which the effort, resulting from the difference in pressures between the vacuum and pressure $P_s$, is applied along its longitudinal axis passing through the pivot axis of the balance beam, in order not to create a parasitic torque on the testing body.

BRIEF DESCRIPTION OF THE DRAWINGS

The invention will be more readily understood on reading the following description with reference to the accompanying drawings, wherein.

DESCRIPTION OF A PREFERRED EMBODIMENT OF THE INVENTION

Figure 1:
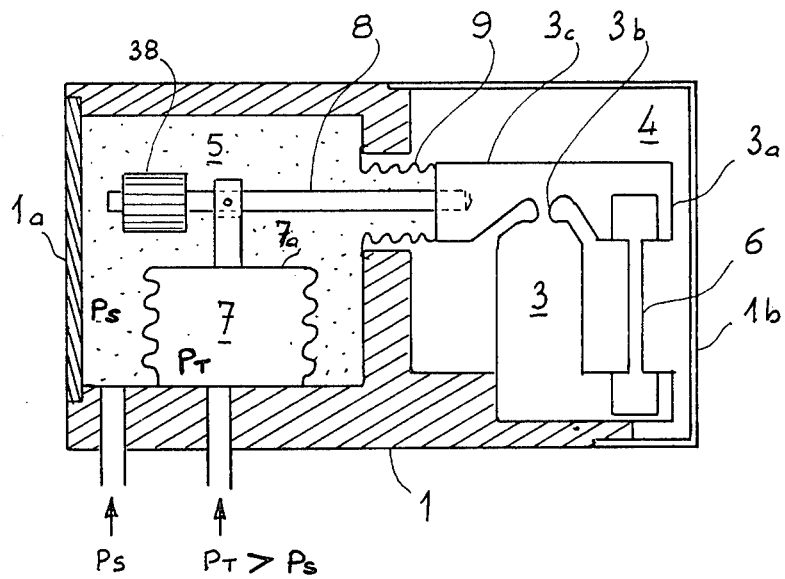
FIG. 1 is an view elevational partly in cross-section of a first embodiment of the invention.

Referring now to the drawings, FIG. 1 shows a differential pressure gauge which comprises a rigid frame 1, on which is fixed a balance beam unit 3 made by machining in a block of bronze or steel. Bores and slots leave only a thin blade of metal 3b which serves as pivot for the actual balance beam and operates like the fulcrum of a balance. Lids 1a, 1b define two rigid chambers 4 and 5 in the casing 1. The chamber 4 contains the balance beam unit 3 and the testing body 6, the latter being constituted by a vibrating blade, cut for example in a quartz monocrystal, connected to the arm 3a of the balance beam 3. The manner of vibrating blade 6 is known in the art as shown in the above referred to French Pat. No. 2456995 and U.S. Pat. No. 4,311,053 and therefore is not described in detail herein.

Beryllium bronze has preferably been chosen because its thermal drift is such that it partly compensates that of the blade.

The chamber 5 contains the deformable element constituted by a bellows 7, of useful section S, fixed on the frame, and of which the free end 7a acts on a rod 8 fixed to the other arm 3c of the balance beam.

This rod 8 transmits the force, resulting from the pressure differences $P_T$ and $P_s$ prevailing respectively in the chambers 7 and 5. This force is applied, via the arm 3a of the balance beam, on the testing body 6. To maintain the coefficient of quality constant and to overcome the visco-elastic phenomena on the testing body 6, a very high vacuum is made in the chamber 4.

Seal between the chambers 5 and 4 is ensured by means of a bellows 9 of useful section s.

To overcome the errors of common mode which might be produced by the small bellows 9, its longitudinal axis passing through its point of anchorage on the balance beam, or on the rod 8, must merge with the axis x of the articulation 3b.

Moreover, for the force transmitted by the bellows 7 on the rod 8, which is the image of the measurement of pressure $\Delta P$, not to be erroneous, its section S must be very large vis-à-vis the transverse section s of the seal bellows 9, and the stiffness of the bellows 9 must be small with respect to the stiffness of the articulation 3b in order not to introduce parasitic stresses on the testing body 6.

The beat frequency of the quartz of the testing body 6 is a function of the rate of stress to which it is subjected via the balance beam and the measuring bellows 7. It is this frequency which constitutes the so-called output information of the gauge, similarly to the manner described in French Pat. No. 2456995 and U.S. Pat. No. 4,311,053 referred to above. This frequency is maintained and detected by the physical principle of piezo-electricity, by metallized electrodes made on the testing body, either by evaporation in vacuo with selective masks, or by cathode sputtering of a cut-out for example by laser.

Figure 2:
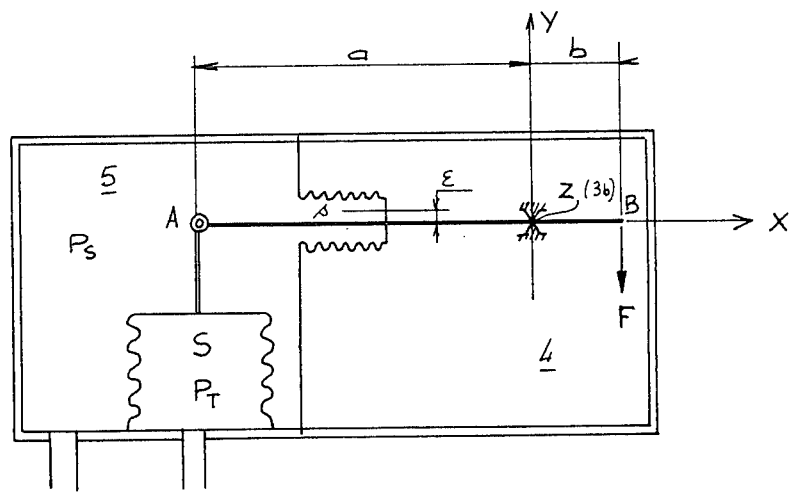
FIG. 2 is a schematic diagram of the differential pressure gauge of FIG. 1.

The equation of the forces as shown in FIG. 2 may be written as follows:

$$P_T.S.a - P_s.S.a + P_s.s.\epsilon - F.b = 0$$

or $$P_T - P_s \left(1 - \frac{s \cdot \epsilon}{S \cdot a}\right) = F \cdot \frac{b}{S \cdot a} = F \cdot \frac{\lambda}{S}$$

where $\lambda$ is the ratio of the arms of the lever b/a, and $\epsilon$, the error in alignment of the bellows with respect to the axis X of the articulation of the balance beam.

If it is arranged by construction to have: $\epsilon = 0$, $P_T - P_s = \lambda F/S = \Delta P$ is obtained, where $\lambda/S$ is the factor of sensitivity of the gauge.

If it is not zero, the parasitic torque becomes: $P_s.s.\epsilon$ and the error on $\Delta P$ is $P_s.s.\epsilon/S.a$.

This error will be the less with:
$\epsilon$ close to zero
a very large before $\epsilon$
s very small vis-à-vis S
Example of digital application:
  With $P_s$ (max) = 1100 mbar
  $P_T$ (max) = 1500 mbar
  s = 0.03 cm$^2$
  S = 1 cm$^2$
  $\epsilon$(max) = 0.0005 cm
  a = 1 cm
  the maxi error will be 1.65 $10^{-2}$ mbar
  or 1.1 $10^{-5}$ of the extent of measurement (E.M.) for EM = 1500 mbar.

If the alignment of the axis of the bellows 9 and of the pivot axis of the balance beam is not good, the stress due to the bellows 9 is then not entirely absorbed by the articulation 3b of the balance beam and a parasitic torque may appear. Moreover, this torque is not constant as it depends on the mechanical characteristics and the variations of effective surface of the bellows 9 depending on the value of the pressure existing in the chamber 5.

Figure 3:
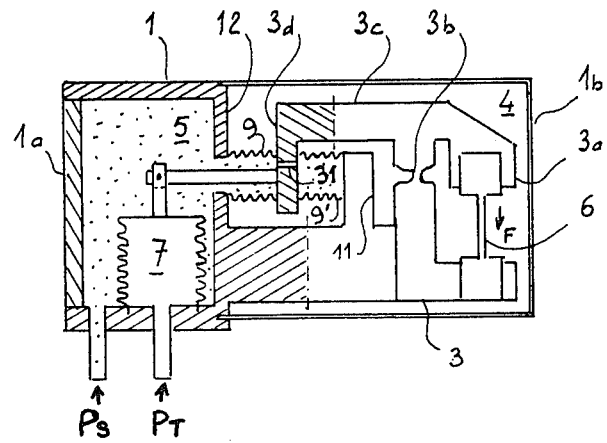
FIG. 3 is an elevational view partly in cross-section of a second embodiment of the invention.

To overcome this defect and improve sensitivity of this type of gauge further, a second bellows 9' is mounted in opposition, of which the characteristics are as identical as possible to those of the bellows 9. To this end, the arm 3c of the balance beam 3, of which the arm 3a is still fixed on one of the ends of the testing body 6, is bent at right angles (FIG. 3). It is on one face of this bent part 3d that the bellows 9 abuts, whilst the compensator bellows 9' abuts on the other face.

A hole 31 is provided in the bend 3d to allow the pressure prevailing in the chamber 5 to be established uniformly in the two bellows.

In this way, the two bellows being disposed on either side of the arm 3d, between two fixed points 11 and 12 of the frame 1, their anomalies and stresses compensate one another.

The stiffness of these bellows is little with respect to the stiffness of the articulation 3b of the balance beam, in order not to introduce parasitic stresses at testing body level.

The ratio between the effective surface of the bellows 9, 9' and the effective surface of the measuring bellows 7 is large, in order that their influence on the transmission of force F is negligible.

On the other hand, to reduce the errors of common mode to a maximum, the longitudinal axis of the bellows 9, 9' and their point of anchorage on the balance beam are aligned with the axis X of the articulation of the balance beam. Static equilibrium masses 31 located on the axes X and Y make it possible to return the center of gravity of the mobile equipment on the axis Z of the articulation of the balance beam which is also the pivot axis. Along axis X, balance is effected on the measuring bellows side.

Figure 4:
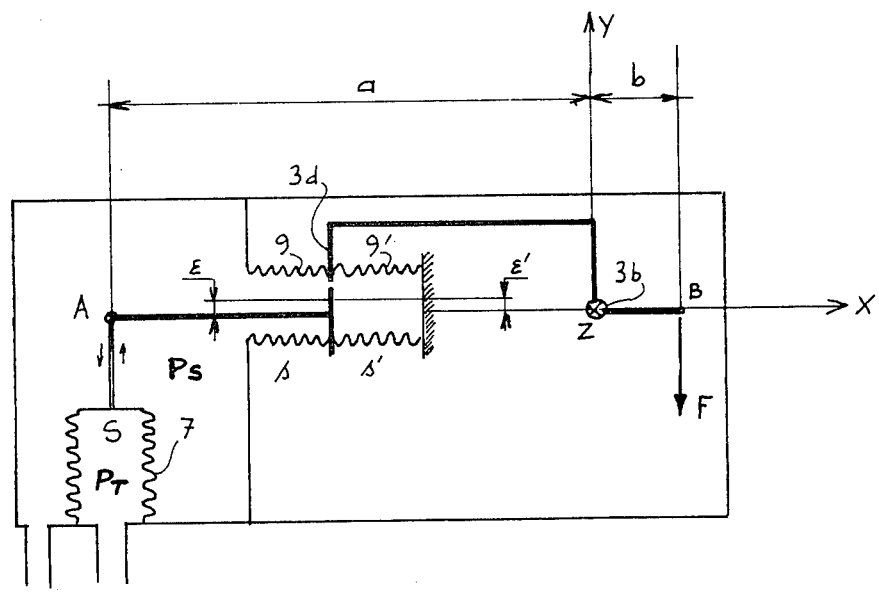
FIG. 4 is a schematic diagram of the gauge of FIG. 3.

Considering the isolated balance beam, the force balancing equation may be written, according to FIG. 4, as follows:

$$P_T \cdot S \cdot a - P_s \cdot S \cdot a + P_s \cdot s \cdot \epsilon - P_s \cdot s' \cdot \epsilon' - F \cdot b = 0$$

$$P_T - P_s \left(1 - \frac{s \cdot \epsilon - s' \cdot \epsilon'}{S \cdot a}\right) = \frac{\lambda}{S} \cdot F$$

the error $\sigma$ on $\Delta P = P_T - P_s$ is $$\sigma = P_S \cdot \frac{s \cdot \epsilon - s' \cdot \epsilon'}{S \cdot a}$$

For $\sigma$ to be small, it is necessary for:
1. $s.\epsilon = s'.\epsilon'$
2. $s.\epsilon - s'.\epsilon'$ to be very small before S.a
3. $s = s'$ by the choice of the bellows
4. $\epsilon = \epsilon'$, $\epsilon$ and $\epsilon'$ representing the errors in alignment of the axes of each of the bellows with respect to the axis X of articulation of the balance beam: $\epsilon = \epsilon'$ may be obtained by a high-precision machining of the pieces or by a device for adjusting the points of application of the action of the bellows enabling them to merge.

By way of example, for a pressure $P_T$ of 1500 mb(maxi) and $P_s = 1100$ mb(maxi) with:
  s' = 0.03 cm$^2 \pm 0.00003$ cm$^2$ $s = 0.03 \text{ cm}^2 \pm 0.00003 \text{ cm}^2$
$\epsilon = \pm 0.0005 \text{ cm}$
$\epsilon' = \pm 0.0005 \text{ cm}$
$S = 1 \text{ cm}^2$
$a = 1 \text{ cm}$ the error on $\Delta P$ is:

$$\sigma = 1100 \frac{0.03 \times 5.10^{-4} + 0.3003 \times 5.10^{-4}}{1}$$

$\sigma = 1100 \times 0.06003 \times 5.10^{-4}$
$\sigma = 0.033 \text{ mbar}$

The performances of the gauge can be improved with an adjustment enabling the above-mentioned points of application to merge, to obtain $\epsilon = \epsilon'$. In this case:

$$\sigma = \frac{P_s}{S \cdot a}(s - s') \cdot \epsilon$$

$$\sigma = \frac{1100}{1} \times 3.10^{-5} \times 5.10^{-4}$$

or a very small error of the order of:
$\sigma = 16.5 \cdot 10^{-6} \text{ mbar}$ The device according to the invention makes it possible to produce pressure gauges and more particularly differential pressure gauges with very high precision and sensitivity, delivering information in digital form and promoting use thereof in aeronautics.

We claim:

1. In a differential pressure gauge comprising wherein a piezoelectric testing body with a vibrating blade is fixed at one end on a fixed frame and at the other end on one of the arms of a balance beam, mounted on a pivot axis, transmitting thereto a force resulting from the difference in pressure ($P_T - P_s$) existing between two distinct chambers, of which at least one is deformable, and subjected respectively to the pressures of which the difference is to be measured, the improvement comprising the testing body and the balance beam are disposed in a first rigid chamber, a vacuum in said first chamber, the balance beam being subjected to the action of a force, resulting from the deformation of an expansible chamber subjected to the pressure $P_T$ disposed in a second rigid chamber subjected to pressure $P_s$, and an expansible seal element mounted between said rigid chambers so that it is subjected on one side to said vacuum and on the other side to said pressure $P_s$, and of which the effect resulting from the difference in pressure between said vacuum and pressure $P_s$ is applied along its longitudinal axis passing through the pivot axis of the balance beam.

2. The pressure gauge of claim 1, wherein the said vibrating blade comprises a blade cut from a quartz monocrystal.

3. The pressure gauge as claimed in claims 1 or 2, wherein the expansible seal element comprises a tight bellows whose useful section(s) is very small relative to the useful section (S) of the expansible chamber subjected to pressure P.

4. The pressure gauge as claimed in claim 2, wherein the balance beam is cut from a block of bronze whose drift compensates that of the quartz blade.

5. The pressure gauge as claimed in claim 3, wherein, to compensate the variations in mechanical stresses peculiar to the seal bellows, a second, mechanically identical seal bellows is provided, which is subjected to the same pressure as the seal bellows and mounted in opposition therewith.

6. The differential pressure gauge as claimed in claim 5, wherein the balance beam has an arm bent at 90°, on its pivot side and on which the two seal bellows abut on either side.

* * * * *